(12) United States Patent
Hou et al.

(10) Patent No.: US 9,912,490 B2
(45) Date of Patent: Mar. 6, 2018

(54) METHOD AND DEVICE FOR DELETING SMART SCENE

(71) Applicant: Xiaomi Inc., Beijing (CN)

(72) Inventors: Enxing Hou, Beijing (CN); Feiyun Li, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 90 days.

(21) Appl. No.: 15/001,855

(22) Filed: Jan. 20, 2016

(65) Prior Publication Data
US 2016/0294574 A1 Oct. 6, 2016

(30) Foreign Application Priority Data
Mar. 31, 2015 (CN) .......................... 2015 1 0148071

(51) Int. Cl.
*H04L 12/28* (2006.01)
*G06F 21/41* (2013.01)
*H04M 1/725* (2006.01)
*H04W 4/00* (2018.01)
*H04L 12/24* (2006.01)
(Continued)

(52) U.S. Cl.
CPC .......... *H04L 12/2809* (2013.01); *G06F 21/35* (2013.01); *G06F 21/41* (2013.01); *H04L 12/2827* (2013.01); *H04L 41/0816* (2013.01); *H04M 1/7253* (2013.01); *H04W 4/008* (2013.01); *H04W 12/08* (2013.01); *H04W 24/02* (2013.01)

(58) Field of Classification Search
CPC ............. H04L 12/2809; H04L 12/2827; H04L 41/0816; H04W 12/08; H04W 24/02; H04W 4/008; G06F 21/35; G06F 21/41; H04M 1/7253
See application file for complete search history.

(56) References Cited

U.S. PATENT DOCUMENTS 5,946,377 A    8/1999  Wolf
6,192,282 B1   2/2001  Smith et al.
(Continued)

FOREIGN PATENT DOCUMENTS

CA    2 141 282 A1    9/1995
CN    101594251 A     12/2009
(Continued)

OTHER PUBLICATIONS

Extended European Search Report dated Sep. 26, 2016 for European Application No. 16152943.3, 7 pages.
(Continued)

*Primary Examiner* — Thai Nguyen
(74) *Attorney, Agent, or Firm* — Brinks, Gilson & Lione (57) ABSTRACT

A method and a device are provided for deleting a smart scene in the field of smart home. The device receives an unbundling notification message indicating that a designated smart device has been successfully unbundled. The device detects whether a target smart scene set with the designated smart device exists among established smart scenes. When a target smart scene set with the designated smart device exists among the established smart scenes, the device deletes the target smart scene. A smart scene set with a smart device is deleted after the designated smart device is successfully unbundled.

20 Claims, 6 Drawing Sheets (51) Int. Cl.
*H04W 24/02* (2009.01)
*G06F 21/35* (2013.01)
*H04W 12/08* (2009.01)

(56) References Cited

U.S. PATENT DOCUMENTS

| | | | |
|---|---|---|---|
| 2002/0122076 A1* | 9/2002 | Nakaki | G06F 3/0481 715/847 |
| 2003/0040819 A1* | 2/2003 | Gonzales | H04L 12/2803 700/83 |
| 2006/0259332 A1 | 11/2006 | Brown | |
| 2009/0019401 A1 | 1/2009 | Park et al. | |
| 2011/0315763 A1 | 12/2011 | Hochmuth et al. | |
| 2014/0316819 A1* | 10/2014 | Dunsirn | G06F 19/322 705/3 |

FOREIGN PATENT DOCUMENTS

| | | |
|---|---|---|
| CN | 102999358 A | 3/2013 |
| CN | 103116336 A | 5/2013 |
| CN | 103616860 A | 3/2014 |
| CN | 103763107 A | 4/2014 |
| CN | 103942855 A | 7/2014 |
| CN | 104102141 A | 10/2014 |
| CN | 104142659 A | 11/2014 |
| CN | 104142775 A | 11/2014 |
| CN | 104281453 A | 1/2015 |
| CN | 104330974 A | 2/2015 |
| CN | 104363034 A | 2/2015 |
| CN | 104363154 A | 2/2015 |
| CN | 104394045 A | 3/2015 |
| CN | 104468837 A | 3/2015 |
| CN | 104808501 A | 7/2015 |
| JP | 2013-210952 A | 10/2013 |
| JP | 2014-032501 A | 2/2014 |
| JP | 2015-033088 A | 2/2015 |
| KR | 10-2011-0006834 A | 1/2011 |
| KR | 10-2012-0080860 A | 7/2012 |
| KR | 10-1420574 B1 | 7/2014 |
| KR | 10-2014-0141613 A | 12/2014 |
| KR | 10-2016-0127625 A | 2/2016 |
| KR | 101723556 B1 | 4/2017 |
| RU | 53 510 U1 | 5/2006 |
| RU | 98 266 U1 | 10/2010 |
| RU | 108 611 U1 | 9/2011 |
| RU | 130 098 U1 | 7/2013 |
| WO | WO 2016/155233 A1 | 10/2016 |

OTHER PUBLICATIONS

Office Action dated Aug. 22, 2016 for Korean Application No. 10-2015-7030829, 4 pages.
Office Action dated Feb. 3, 2017 for Chinese Application No. 201510148071.0, 10 pages.
Office Action dated Feb. 21, 2017 for Korean Application No. 10-2015-7030829, 5 pages.
Office Action dated Feb. 10, 2017 for Russian Application No. 2015144504/08, 16 pages.
International Search Report dated Jan. 6, 2016 for International Patent Application No. PCT/CN2015/088705, 5 pages.
Office Action dated Jun. 27, 2017 for Japanese Application No. 2017-508741, 5 pages.
Office Action dated Jul. 28, 2017 for Mexican Application No. MX/a/2015/015143, 4 pages.

* cited by examiner

METHOD AND DEVICE FOR DELETING SMART SCENE

The present application is based upon and claims priority to Chinese Patent Application No. CN201510148071.0, filed Mar. 31, 2015, the entire contents of which are incorporated herein by reference.

TECHNICAL FIELD

The present disclosure generally relates to the field of smart home, and more particularly, to a method and a device for deleting a smart scene.

BACKGROUND

In a smart home, in order to effectively implement various smart scenes, smart devices may be bundled, and various smart scenes may be defined with the bundled smart devices. For example, to set a certain smart scene, a triggering condition of the smart scene may be set with a first smart device which has been successfully bundled, and a second smart device which has been successfully bundled is to be set to perform a corresponding action.

When a user unbundles a certain smart device, smart scenes defined with the smart device are required to be deleted. To delete the smart scenes, the following operations may be performed successively: selecting one of the smart scenes, triggering a deleting widget for deleting the smart scene, and the device deleting the smart scene according to a deleting instruction generated when the deleting widget is triggered.

SUMMARY

According to a first aspect of embodiments of the present disclosure, there is provided a method for deleting a smart scene. The method includes following acts: receiving an unbundling notification message indicating that a designated smart device has been successfully unbundled; detecting whether a target smart scene set with the designated smart device exists among established smart scenes; and when a target smart scene set with the designated smart device exists among the established smart scenes, deleting the target smart scene.

According to a second aspect of embodiments of the present disclosure, there is provided a device for deleting a smart scene. The device includes: a processor; and a memory for storing instructions executable by the processor. The processor is configured to perform: receiving an unbundling notification message indicating that a designated smart device has been successfully unbundled; detecting whether a target smart scene set with the designated smart device exists among established smart scenes; and when a target smart scene set with the designated smart device exists among the established smart scenes, deleting the target smart scene.

According to a third aspect of embodiments of the present disclosure, there is provided a non-transitory computer-readable storage medium storing instructions. When being executed by a processor of a device, the instructions cause the device to perform acts including: receiving an unbundling notification message indicating that a designated smart device has been successfully unbundled; detecting whether a target smart scene set with the designated smart device exists among established smart scenes; and when a target smart scene set with the designated smart device exists among the established smart scenes, deleting the target smart scene.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Figure 1:
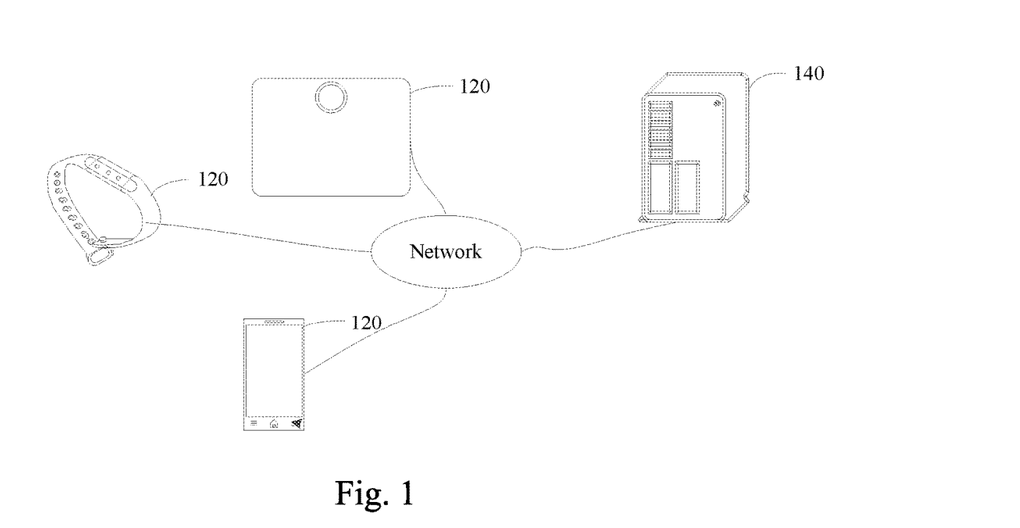
FIG. 1 is a schematic diagram of an implementing environment involved in a method for deleting a smart scene according to some exemplary embodiments.

FIG. 1 is a schematic diagram of an implementing environment involved in a method for deleting a smart scene according to some exemplary embodiments. As shown in FIG. 1, the implementing environment can include at least one bundled smart device 120 and an unbundling device 140. Here the smart scene may involve one or more smart devices to work together. The one or more smart devices may perform an action according to information from sensors in the smart devices. For example, the one or more smart devices may adjust settings, control other devices, or change displayed information on the one or more smart devices using the information collected from the one or more smart devices.

The smart device 120 may be a smart phone, a smart TV, a smart socket, a smart water dispenser, a smart scale, a wearable device, an e-book reader, a multimedia player, a laptop portable computer and a desktop computer. Here, the wearable device may be a device wearable by a user, such as a smart wrist band, a smart key chain, a smart watch, a smart tie clip, a smart ring or the like. All of the smart devices 120 may be connected to the same local area network.

The unbundling device 140 may be a network-side device, such as a router, a server or the like, or a network-side device cluster consisting of several sets of network-side devices, or a cloud computing service center.

Figure 2:
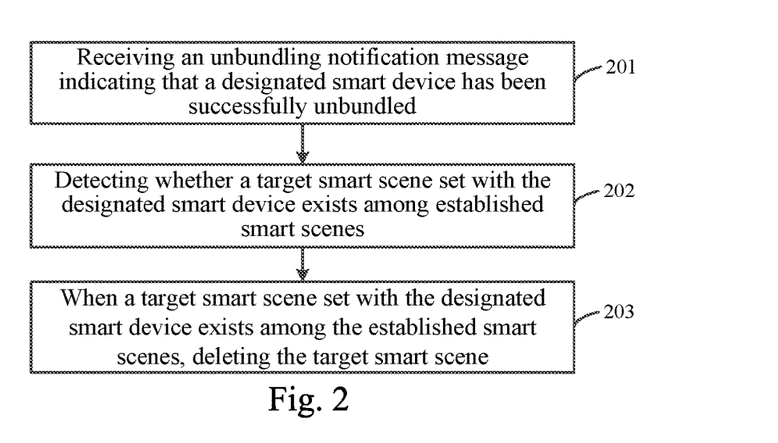
FIG. 2 is a flow chart of a method for deleting a smart scene according to an exemplary embodiment.

FIG. 2 is a flow chart of a method for deleting a smart scene according to an exemplary embodiment. The method may be used for disconnecting previously bundled smart devices. As shown in FIG. 2, the method for deleting a smart scene may be implemented at least partially in a smart device 120 in the implementing environment as shown in FIG. 1. Alternatively or additionally, the method for deleting a smart scene may also be implemented at least partially in a smart device out of the local area network in the implementing environment as shown in FIG. 1. Here, the smart device may be a device having an operating screen, such as a mobile phone, a computer or the like. The method for deleting a smart scene may include the following steps.

In step 201, an unbundling notification message indicating that a designated smart device has been successfully unbundled is received. The step may be implemented by a designated smart device or a smart device connected to the local area network.

In a smart home, a user may bundle various smart devices in a local area network in his home with his own account, or can unbundle a smart device already bundled under the user account, that is, releasing the bundling relationship between the smart device and the user account.

In step 202, it is detected whether a target smart scene set with the designated smart device exists among established smart scenes.

For example, when a smart scene is set, if a first smart device is utilized to set a triggering condition, a second smart device is utilized to set a corresponding action to be performed, the smart scene is implemented as: when the first smart device satisfies the triggering condition, the second smart device performs the set corresponding action.

Additionally or alternatively, the triggering condition may be set with one or more first smart devices. It is possible that one or more second smart devices are set to respectively perform the same action or different actions.

In step 203, when a target smart scene set with the designated smart device exists among the established smart scenes, the target smart scene is deleted.

Accordingly, in the method for deleting a smart scene provided by the embodiments of the present disclosure, a smart scene set with a smart device is deleted after the designated smart device is successfully unbundled. Because the smart scene set with the smart device may be directly deleted, it solves a problem that the smart scene defined with the unbundled smart device has to be deleted manually and thus resulting in complicated deleting operations. Thus, it achieves an effect that smart scenes which cannot be normally performed may be quickly deleted and thus simplifying the deleting operation for deleting the smart scenes which cannot be normally performed.

Figure 3A:
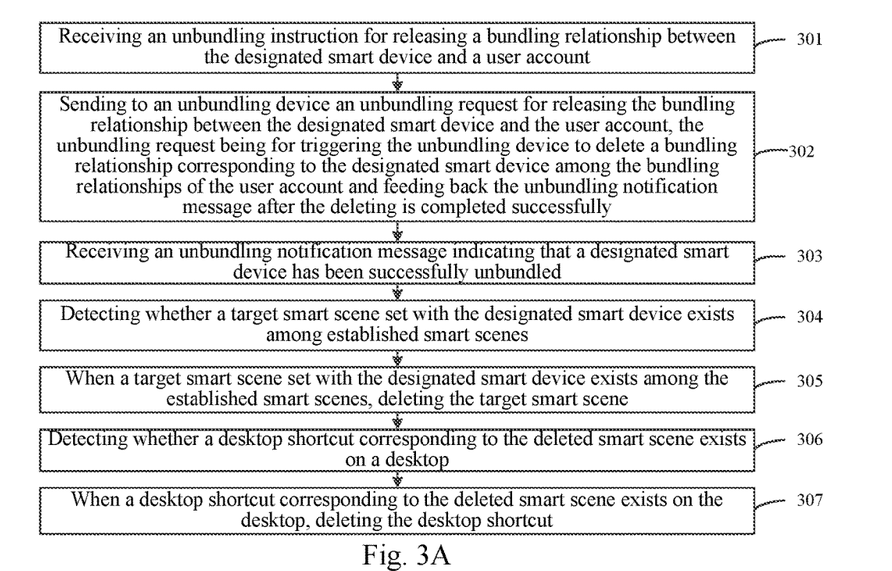
FIG. 3A is a flow chart of a method for deleting a smart scene according to another exemplary embodiment.

FIG. 3A is a flow chart of a method for deleting a smart scene according to another exemplary embodiment. As shown in FIG. 3A, the method for deleting a smart scene may be implemented at least partially in a smart device 120 in the implementing environment as shown in FIG. 1. Alternatively or additionally, the method for deleting a smart scene may also be implemented at least partially in a smart device out of the local area network in the implementing environment as shown in FIG. 1. Here, the smart device may be a device having an operating screen, such as a mobile phone, a computer or the like. The method for deleting a smart scene includes the following steps.

In step 301, an unbundling instruction for releasing a bundling relationship between the designated smart device and a user account is received.

In a smart home, a user can bundle various smart devices in the local area network in his home with his own account, or can unbundle a smart device already bundled under the user account, that is, releasing the bundling relationship between the smart device and the user account.

Typically, during the bundling, an electronic device (such as a mobile phone, a tablet computer or the like) held by the user may send an identification of a smart device to be bundled and a user account logging on the electronic device to a bundling device. The bundling device stores a bundling relationship between the identification of the smart device and the user account, to complete the bundling of the smart device and the user account.

Likewise, the user may also release the bundling relationship between the smart device and the user account. For example, the user may log on the electronic device of the user account to check whether the user account has successfully bundled one or more smart devices, and select one bundling relationship between a designated smart device and the user account. Correspondingly, the electronic device may receive from the user an unbundling instruction for releasing the bundling relationship between the designated smart device and the user account.

Figure 3B:
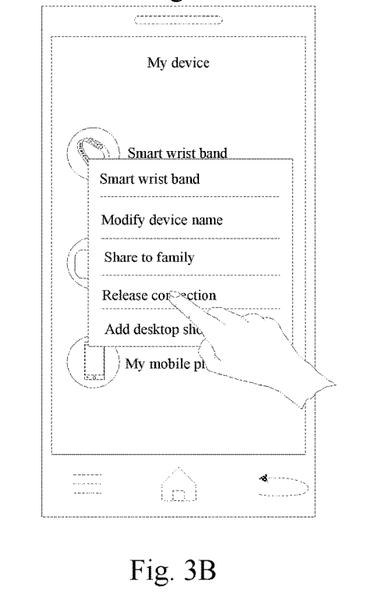
FIG. 3B is a schematic diagram of releasing bundling of a smart wrist band according to an exemplary embodiment.

Referring to FIG. 3B, which is a schematic diagram of releasing bundling of a smart wrist band according to an exemplary embodiment. After the user clicks a widget "release connection," the electronic device receives an unbundling instruction for releasing the bundling relationship between the smart wrist band and the user account.

In step 302, an unbundling request for releasing the bundling relationship between the designated smart device and the user account is sent to an unbundling device, the unbundling request being for triggering the unbundling device to delete a bundling relationship corresponding to the designated smart device among the bundling relationships of the user account and feeding back the unbundling notification message after the deleting is completed successfully.

In order to unbundle successfully the designated smart device and the user account, relevant information about the unbundling is required to be sent to the unbundling device. At this time, the electronic device receiving the unbundling instruction may send an unbundling request for releasing the bundling relationship between the designated smart device and the user account to the unbundling device. Correspondingly, after it receives the unbundling request, the unbundling device may detect whether a bundling relationship between the designated smart device and the user account exists. If a bundling relationship between the designated smart device and the user account exists in the unbundling device, the stored bundling relationship between the designated smart device and the user account exists in the unbundling device is deleted in the unbundling device, and an unbundling notification message is fed back to the electronic device after the deleting is completed successfully.

In step 303, the unbundling notification message indicating that the designated smart device has been successfully unbundled is received.

In step 304, it is detected whether a target smart scene set with the designated smart device exists among established smart scenes.

When the electronic device receives the unbundling notification message sent by the unbundling device, it means that the unbundling device has successfully unbundled the bundling relationship between the designated smart device and the user account. Because the designated smart device is no longer bundled with the user account, the smart scene set with the designated smart device is to be released. At this time, the electronic device may detect whether a target smart scene set with the designated smart device exists among established smart scenes.

For example, when a user loses his smart wrist band, the smart scenes previously set with the smart wrist band in the family local area network are typically no longer applicable. For example, a triggering condition of a certain smart scene has been set with the smart wrist band, and since the smart wrist band is lost, the triggering condition defined with the smart wrist band can no longer be satisfied in the local area network, smart scenes involving the smart wrist band may be canceled.

Additionally or alternatively, prior to the step 304, the method may also include: displaying prompt information prompting whether to delete the smart scenes related to the designated smart device. After the user sees the prompt information and triggers a deleting widget in the prompt information, the electronic device receives a deleting instruction instructing to delete the smart scenes related to the designated smart device, and performs step 304.

The electronic device detecting whether a target smart scene set with the designated smart device exists among established smart scenes may include: searching for a corresponding relationship involving an identification of the designated smart device among corresponding relationships between identifications of smart scenes and identifications of smart devices, a corresponding relationship between an identification of a smart scene and an identification of a smart device being a corresponding relationship between the identification of the smart scene and the identification of the smart device involved in the establishment of the smart scene and the corresponding relationship being stored after the smart scene is established.

Generally, after a smart scene is established, the identification of the smart device involved in the established scene and the identification of the smart scene may be correspondingly stored.

For example, if a smart scene has a triggering condition set with a first smart device, and a corresponding action to be performed which is set with a second smart device, a corresponding relationship among the identification of the first smart device, the identification of the second smart device and the identification of the smart scene may be saved.

In step 305, when a target smart scene set with the designated smart device exists among the established smart scenes, the target smart scene is deleted.

If a designated smart device has been successfully unbundled, it means that the user can no longer utilize the smart device. When a target smart scene set with the designated smart device exists among established smart scenes, the target smart scene may be directly deleted. The deleted target smart scene will no longer presented or utilized.

Figure 3C:
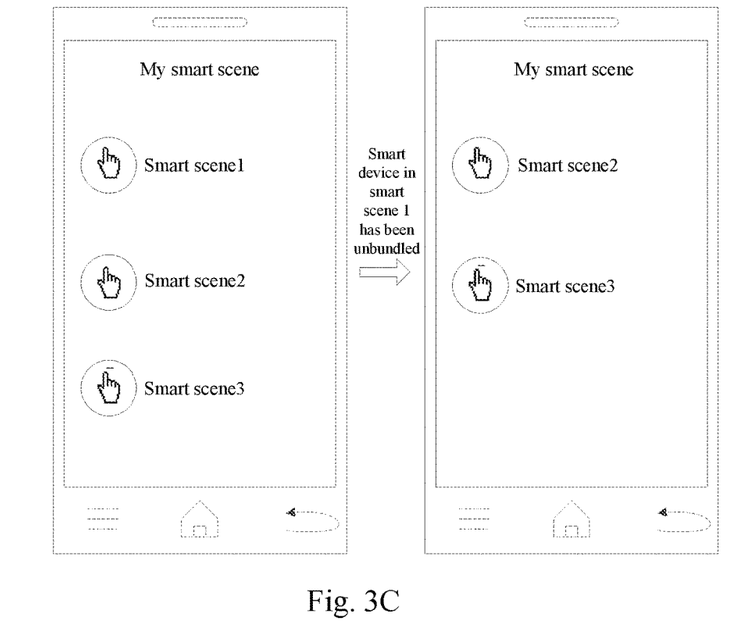
FIG. 3C is a schematic diagram of a display interface of a list of smart scenes after a target smart scene is deleted according to an exemplary embodiment.

After the target smart scene is deleted, the deleted target smart scene is no longer displayed in a list of smart scenes under the user account. FIG. 3C is a schematic diagram of a display interface of a list of smart scenes after a target smart scene is deleted according to an exemplary embodiment. After a smart device involved in a smart scene 1 is unbundled, the smart scene 1 is deleted from the list of smart scenes as displayed.

In step 306, it is detected whether a desktop shortcut corresponding to the deleted smart scene exists on a desktop.

When a smart scene is established, a desktop shortcut is typically generated on the desktop of the electronic desktop. For the user to easily perform the smart scene, after the smart scene is deleted, it may be further checked whether a desktop shortcut corresponding to the deleted smart scene exists on the desktop of the electronic device.

In step 307, when a desktop shortcut corresponding to the deleted smart scene exists on the desktop, the desktop shortcut is deleted.

Figure 3D:
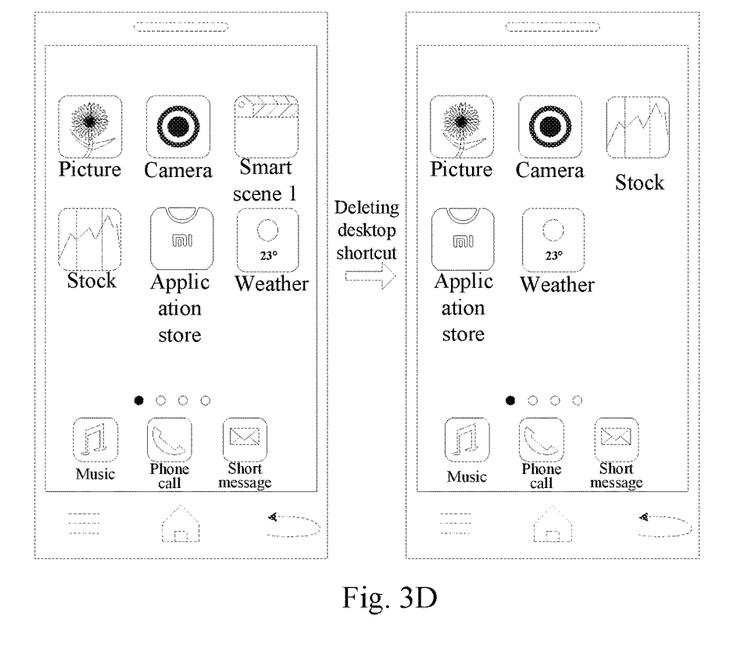
FIG. 3D is a schematic diagram of deleting a desktop shortcut according to an exemplary embodiment.

FIG. 3D is a schematic diagram of deleting a desktop shortcut according to an exemplary embodiment. As shown in FIG. 3D, if the smart scene 1 is deleted, and there is a shortcut of the smart scene 1, the desktop shortcut of the smart scene 1 will be further deleted.

Accordingly, in the method for deleting a smart scene provided by the embodiments of the present disclosure, a smart scene set with a smart device is deleted after the designated smart device is successfully unbundled. Because the smart scene set with the smart device may be directly deleted, it solves a problem that the smart scene defined with the unbundled smart device has to be deleted manually and thus resulting in complicated deleting operations. The disclosure achieves an effect that smart scenes which cannot be normally performed may be quickly deleted and thus simplifying the deleting operation for deleting the smart scenes which cannot be normally performed.

Figure 4A:
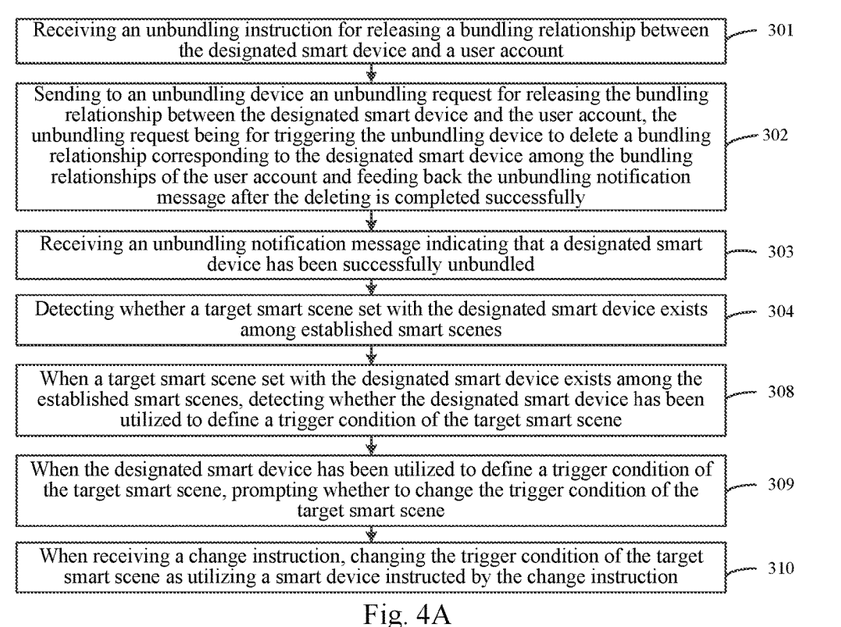
FIG. 4A is a flow chart of a method for deleting a smart scene according to still another exemplary embodiment.

In an implementation, if the designated smart device which has been unbundled has been utilized to define a triggering condition for a target smart scene, in order to ensure other smart device can still perform corresponding actions defined in the target smart scene, the designated smart device which has been utilized to define the triggering condition can also be replaced with another smart device, and the replaced smart device can still be utilized to set the triggering condition for the smart scene. FIG. 4A is a flow chart of a method for deleting a smart scene according to still another exemplary embodiment, the method for deleting a smart scene is performed as steps 308-310 in FIG. 4A after step 304 in FIG. 3.

In step 308, when a target smart scene set with the designated smart device exists among the established smart scenes, it is detected whether the designated smart device has been utilized to define a triggering condition of the target smart scene.

Additionally or alternatively, after a smart scene is established successfully, in storing the identification of the smart scene and the identification of the smart device involved in setting of the smart scene, a specific mark of the smart device which is utilized to set the triggering condition of the smart scene can also be stored. For example, a trigger mark may be added at the identification of the smart device, and so on.

For example, a corresponding relationship between an identification of a smart scene and identifications of the involved smart devices (a smart scene 1, a smart device 1 (for triggering), and a smart device 2 (for performing)) is stored. Wherein, the smart device 1 is the smart device for defining the triggering condition of the smart scene 1, and the smart device 2 is the smart device for defining the action to be performed of the smart scene 1.

In practical application, other trigger marks can also be utilized. For example, a number "1" is used to denote a trigger mark, and the specific representation of the trigger mark is not a limitation to the protective scope of the present disclosure.

Thus, when it detects whether the designated smart device has been utilized to define a triggering condition of the target smart scene, the electronic device can detect whether the identification of the designated smart device includes a trigger mark. If the identification of the designated smart device further includes a trigger mark, it means that the designated smart device has been utilized to define a triggering condition for a target smart scene.

In step 309, when the designated smart device has been utilized to define a triggering condition of the target smart scene, it is prompted whether to change the triggering condition of the target smart scene.

If the designated smart device has been utilized to define a triggering condition of a target smart scene, it means that the smart device for defining the action to be performed for the target smart scene is still applicable. Then the user may be prompted whether to change the triggering condition of the target smart scene.

Figure 4B:
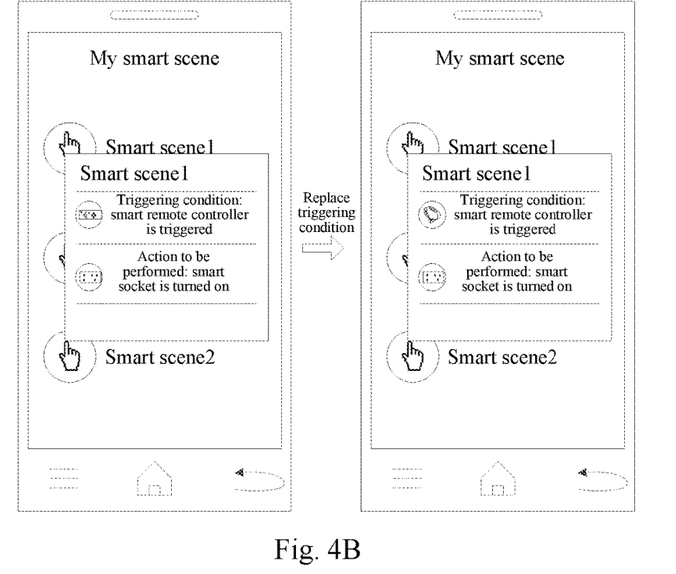
FIG. 4B is a schematic diagram of replacing a triggering condition of a smart device according to an exemplary embodiment.

In step 310, when a change instruction is received, the triggering condition of the target smart scene is changed as utilizing a smart device instructed by the change instruction For example, FIG. 4B is a schematic diagram of replacing a triggering condition of a smart device according to an exemplary embodiment. A smart scene 1 for automatically turning on a smart switch is: when a smart remote controller is triggered, turning on a smart socket. Here, the smart remote controller is the smart device for defining the triggering condition of the smart scene 1, and the smart socket is the smart device for defining the action to be performed of the smart scene 1. If the smart remote controller is successfully unbundled, it may be prompted whether to change the triggering condition of the smart scene 1. For example, the smart remote controller may be changed to a smart wrist band, and the wrist band may be utilized to define the triggering condition of the smart scene 1. For example, the triggering condition may be set as: the smart wrist band detects that someone has entered. Then, the smart scene 1 for automatically turning on a smart switch may be changed as: when the smart wrist band detects that someone has entered, tuning on the smart socket.

Additionally or alternatively, when at least two smart devices are utilized to set a triggering condition of a target smart scene, the designated smart device which has been unbundled may be replaced, and other smart devices for setting the triggering condition may be kept as unchanged, or the triggering condition of the target smart scene may be set only with a replaced smart device.

Accordingly, in the method for deleting a smart scene provided by the embodiments of the present disclosure, after a designated smart device is successfully unbundled, it is detected whether the designated smart device is a smart device has been utilized to define a triggering condition of a target smart scene. If the designated smart device is a smart device which has been utilized to define a triggering condition of a target smart scene, the user is prompted to reset the triggering condition of the target smart scene as utilizing another smart device, so as to ensure that a smart device originally set for performing a corresponding action in the target smart scene can still be applicable. Therefore, when it is required that the second smart device set for performing the corresponding action in the target smart scene is still applicable, the setting procedure of the smart scene may be simplified.

The following are device according to embodiments of the present disclosure, which may be configured to perform the above method embodiments of the present disclosure. For details that are not disclosed in the device embodiments of the present disclosure, reference may be made to the method embodiments of the present disclosure.

Figure 5:
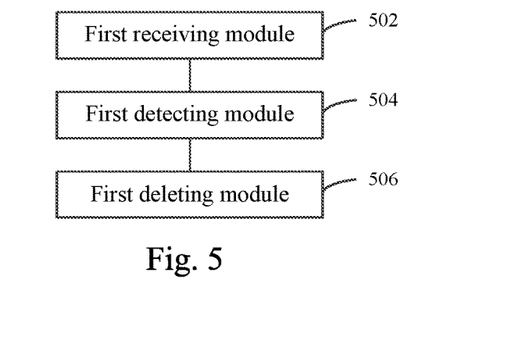
FIG. 5 is a block diagram of a device for deleting a smart scene according to an exemplary embodiment.

FIG. 5 is a block diagram of a device for deleting a smart scene according to an exemplary embodiment. As shown in FIG. 5, the device for deleting a smart scene may be applied in a smart device 120 in the implementing environment as shown in FIG. 1, or the device for deleting a smart scene can also be applied in a smart device out of the local area network in the implementing environment as shown in FIG. 1. Here, the smart device may be a device having an operating screen, such as a mobile phone, a computer or the like. The device for deleting a smart scene includes but not limited to: a first receiving module 502, a first detecting module 504 and a first deleting module 506.

The first receiving module 502 is configured to receive an unbundling notification message indicating that a designated smart device has been successfully unbundled. The first detecting module 504 is configured to detect whether a target smart scene set with the designated smart device exists among established smart scenes. The first deleting module 506 is configured to delete the target smart scene when the first detecting module 504 detects that a target smart scene set with the designated smart device exists among the established smart scenes.

Accordingly, in the device for deleting a smart scene provided by the embodiments of the present disclosure, a smart scene set with a smart device is deleted after the designated smart device is successfully unbundled. Because the smart scene set with the smart device may be directly deleted, it solves a problem that the smart scene defined with the unbundled smart device has to be deleted manually and thus resulting in complicated deleting operations. The disclosure achieves an effect that smart scenes which cannot be normally performed may be quickly deleted and thus simplifying the deleting operation for deleting the smart scenes which cannot be normally performed.

Figure 6:
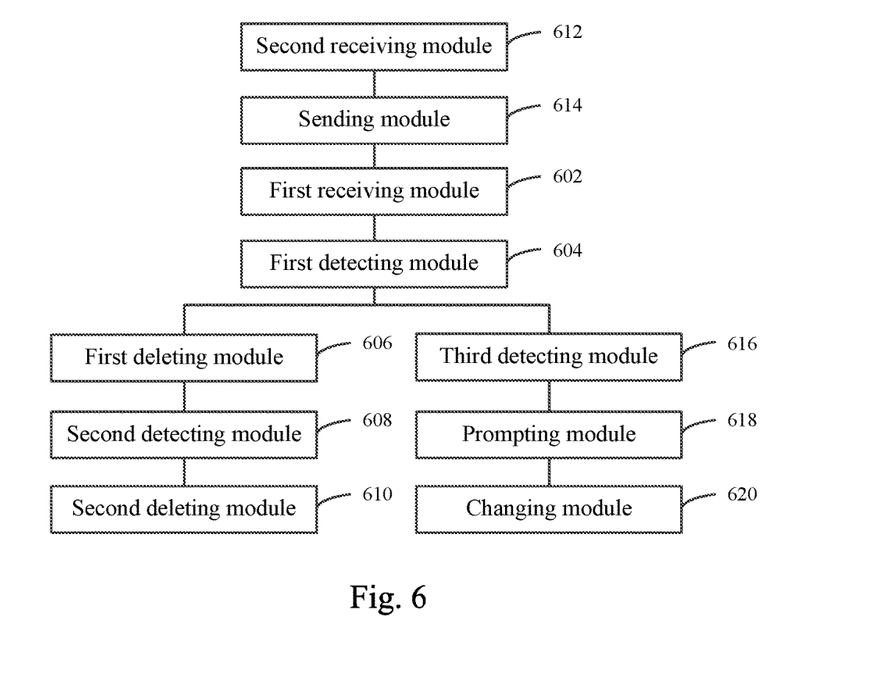
FIG. 6 is a block diagram of a device for deleting a smart scene according to another exemplary embodiment.

FIG. 6 is a block diagram of a device for deleting a smart scene according to another exemplary embodiment. As shown in FIG. 6, the device for deleting a smart scene may be applied in a smart device 120 in the implementing environment as shown in FIG. 1, or the device for deleting a smart scene can also be applied in a smart device out of the local area network in the implementing environment as shown in FIG. 1. Here, the smart device may be a device having an operating screen, such as a mobile phone, a computer or the like. The device for deleting a smart scene includes but not limited to: a first receiving module 602, a first detecting module 604 and a first deleting module 606.

The first receiving module 602 is configured to receive an unbundling notification message indicating that a designated smart device has been successfully unbundled. The first detecting module 604 is configured to detect whether a target smart scene set with the designated smart device exists among established smart scenes. The first deleting module 606 is configured to, when the first detecting module 604 detects that a target smart scene set with the designated smart device exists among the established smart scenes, delete the target smart scene.

In a possible implementation, the device for deleting a smart scene can also include: a second detecting module 608 and a second deleting module 610. The second detecting module 608 is configured to detect whether a desktop shortcut corresponding to the deleted smart scene exists on a desktop. The second deleting module 610 is configured to, when the second detecting module 608 detects that a desktop shortcut corresponding to the deleted smart scene exists on the desktop, delete the desktop shortcut.

In a possible implementation, the device for deleting a smart scene can also include: a second receiving module 612 and a sending module 614. The second receiving module 612 is configured to receive an unbundling instruction for releasing a bundling relationship between the designated smart device and a user account. The sending module 614 is configured to send to an unbundling device an unbundling request for releasing the bundling relationship between the designated smart device and the user account, the unbundling request being for triggering the unbundling device to delete a bundling relationship corresponding to the designated smart device among the bundling relationships of the user account and feeding back the unbundling notification message after the deleting is completed successfully.

In a possible implementation, the first detecting module 604 is further configured to: search for a corresponding relationship involving an identification of the designated smart device among corresponding relationships between identifications of smart scenes and identifications of smart devices, a corresponding relationship between an identification of a smart scene and an identification of a smart device being a corresponding relationship between the identification of the smart scene and the identification of the smart device involved in the establishment of the smart scene and the corresponding relationship being stored after the smart scene is established.

In a possible implementation, the device for deleting a smart scene can also include: a third detecting module 616, a prompting module 618 and a changing module 620.

The third detecting module 616 is configured to, when a target smart scene set with the designated smart device exists among the established smart scenes, detect whether the designated smart device has been utilized to define a triggering condition of the target smart scene. The prompting module 618 is configured to, when the third detecting module 616 detects that the designated smart device been utilized to define a triggering condition of the target smart scene, prompt whether to change the triggering condition of the target smart scene. The changing module 620 is configured to, when receiving a change instruction, change the triggering condition of the target smart scene as utilizing a smart device instructed by the change instruction.

Accordingly, in the device for deleting a smart scene provided by the embodiments of the present disclosure, a smart scene set with a smart device is deleted after the designated smart device is successfully unbundled. Since the smart scene set with the smart device may be directly deleted, it solves a problem that the smart scene defined with the unbundled smart device has to be deleted manually and thus resulting in complicated deleting operations; and it achieves an effect that smart scenes which cannot be normally performed may be quickly deleted and thus simplifying the deleting operation for deleting the smart scenes which cannot be normally performed.

After a designated smart device is successfully unbundled, it is detected whether the designated smart device is a smart device which has been utilized to define a triggering condition of a target smart scene. If the designated smart device is a smart device has been utilized to define a triggering condition of a target smart scene, the user is prompted to reset the triggering condition of the target smart scene as utilizing another smart device, so as to ensure that a smart device originally set for performing a corresponding action in the target smart scene can still be applicable. Therefore, when it is required that the second smart device set for performing the corresponding action in the target smart scene is still applicable, the setting procedure of the smart scene may be simplified.

With respect to the devices in the above embodiments, the specific manners for performing operations for individual modules therein have been described in detail in the embodiments regarding the methods, which will not be elaborated herein. The modules may be implemented using one or more circuitries, integrated circuit chips, etc.

An exemplary embodiment of the present disclosure provides a device for deleting a smart scene, which is capable of implementing the method for deleting a smart scene provided by the present disclosure. The device for deleting a smart scene includes: a processor; and a memory for storing instructions executable by the processor. The processor is configured to perform acts including:

receiving an unbundling notification message indicating that a designated smart device has been successfully unbundled;

detecting whether a target smart scene set with the designated smart device exists among established smart scenes; and when a target smart scene set with the designated smart device exists among the established smart scenes, deleting the target smart scene.

Figure 7:
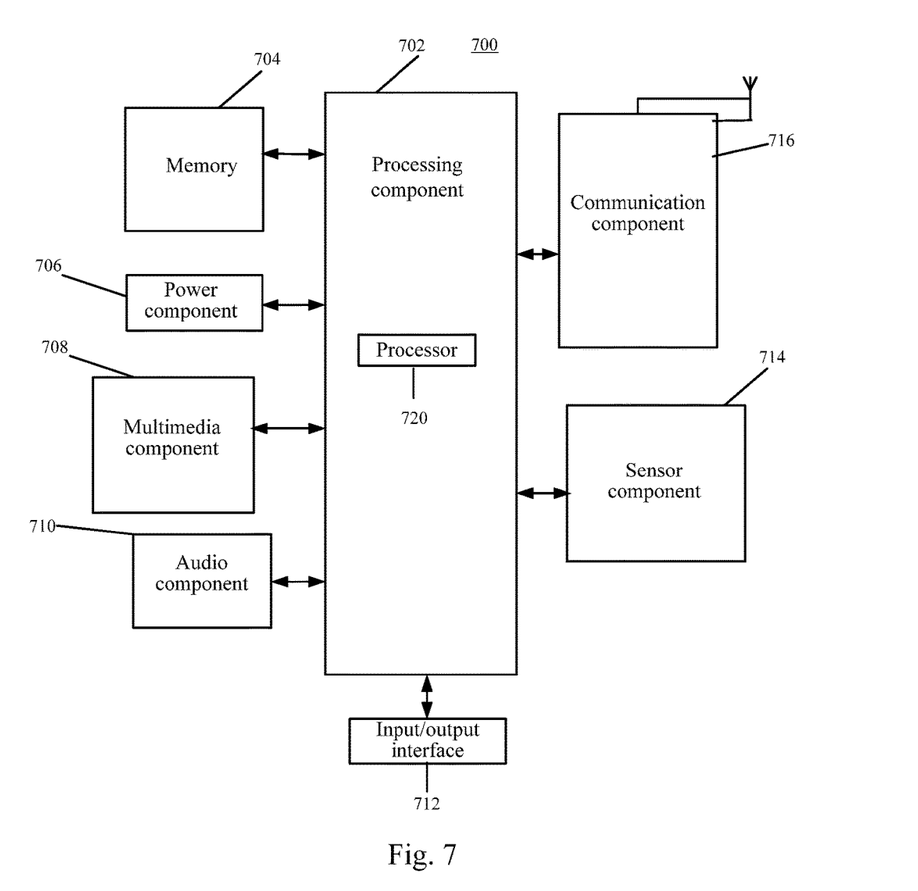
FIG. 7 is a block diagram of a device for deleting a smart scene according to an exemplary embodiment.

FIG. 7 is a block diagram of a device for deleting a smart scene according to an exemplary embodiment, which is applied in a terminal device. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 718 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 718 in the device 700, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention only be limited by the appended claims.

What is claimed is:

1. A method, comprising:
   receiving, by a terminal device, an unbundling notification message indicating that a designated smart device has been successfully unbundled from a user account;
   determining, by the terminal device, whether a target smart scene that is set with the designated smart device is included among established smart scenes associated with the user account, wherein the target smart scene is a conditional dataset including a target triggering condition field and a target action field, the target triggering condition field including a value determined by a condition detected by a condition detector device, and the target action field including instructions for controlling the designated smart device based on the value of the target triggering condition field; and
   when the target smart scene that is set with the designated smart device is determined to be included among the established smart scenes, deleting, by the terminal device, the target smart scene from association with the user account.

2. The method according to claim 1, further comprising:
   detecting whether a desktop shortcut corresponding to the deleted smart scene exists on a desktop graphical user interface of the terminal logged onto the user account; and
   deleting the desktop shortcut when the desktop shortcut corresponding to the deleted smart scene exists on the desktop.

3. The method according to claim 2, further comprising:
   when a target smart scene set with the designated smart device is determined to be included among the established smart scenes, determining, by the terminal device, whether the designated smart device has been utilized to define a triggering condition corresponding to the target triggering condition field of the target smart scene;
   when the designated smart device is determined to have been utilized to define the triggering condition of the target smart scene, prompting, by the terminal device, whether to change the triggering condition corresponding to the target triggering condition field of the target smart scene; and
   when receiving a change instruction, changing, by the terminal device, the triggering condition corresponding to the target triggering condition field of the target smart scene as utilizing a new smart device instructed by the change instruction.

4. The method according to claim 1, further comprising:
   receiving, by the terminal device, an unbundling instruction for releasing a bundling relationship between the designated smart device and the user account; and
   sending, by the terminal device, to an unbundling server device an unbundling request for releasing the bundling relationship between the designated smart device and the user account, the unbundling request configured to trigger the unbundling server device to delete a bundling relationship corresponding to the designated smart device among the bundling relationships of the user account and feed back the unbundling notification message to the terminal after the deleting is completed successfully.

5. The method according to claim 4, further comprising:
   when a target smart scene set with the designated smart device is determined to be included among the established smart scenes, determining, by the terminal device, whether the designated smart device has been utilized to define a triggering condition corresponding to the target triggering condition field of the target smart scene;
   when the designated smart device is determined to have been utilized to define the triggering condition of the target smart scene, prompting, by the terminal device, whether to change the triggering condition corresponding to the target triggering condition field of the target smart scene; and
   when receiving a change instruction, changing, by the terminal device, the triggering condition corresponding to the target triggering condition field of the target smart scene as utilizing a new smart device instructed by the change instruction.

6. The method according to claim 1, wherein determining whether the target smart scene set with the designated smart device exists among established smart scenes, comprises:
   searching, by the terminal device, for a corresponding relationship involving an identification of the designated smart device among corresponding relationships between identifications of smart scenes and identifications of smart devices, wherein a corresponding relationship between an identification of a smart scene and an identification of a smart device comprises a corresponding relationship between the identification of the smart scene and the identification of the smart device involved in the establishment of the smart scene, and wherein the corresponding relationship is stored after the smart scene is established.

7. The method according to claim 6, further comprising:
   when a target smart scene set with the designated smart device is determined to be included among the established smart scenes, determining, by the terminal device, whether the designated smart device has been utilized to define a triggering condition corresponding to the target triggering condition field of the target smart scene;
   when the designated smart device is determined to have been utilized to define the triggering condition of the target smart scene, prompting, by the terminal device, whether to change the triggering condition corresponding to the target triggering condition field of the target smart scene; and
   when receiving a change instruction, changing, by the terminal device, the triggering condition corresponding to the target triggering condition field of the target smart scene as utilizing a new smart device instructed by the change instruction.

8. The method according to claim 1, further comprising:
   when a target smart scene set with the designated smart device is determined to be included among the established smart scenes, determining, by the terminal device, whether the designated smart device has been utilized to define a triggering condition corresponding to the target triggering condition field of the target smart scene;

when the designated smart device is determined to have been utilized to define the triggering condition of the target smart scene, prompting, by the terminal device, whether to change the triggering condition corresponding to the target triggering condition field of the target smart scene; and when receiving a change instruction, changing, by the terminal device, the triggering condition corresponding to the target triggering condition field of the target smart scene as utilizing a new smart device instructed by the change instruction.

9. A device, comprising:
a processor; and
a memory for storing instructions executable by the processor;
wherein the processor is configured to perform acts comprising:
  receiving an unbundling notification message indicating that a designated smart device has been successfully unbundled from a user account;
  determining whether a target smart scene that is set with the designated smart device is included among established smart scenes associated with the user account, wherein the target smart scene is a conditional dataset including a target triggering condition field and a target action field, the target triggering condition field including a value determined by a condition detected by a condition detector device, and the target action field including instructions for controlling the designated smart device based on the value of the target triggering condition field; and
  when the target smart scene that is set with the designated smart device is determined to be included among the established smart scenes, deleting the target smart scene from association with the user account.

10. The device according to claim 9, wherein the processor is further configured to perform:
  detecting whether a desktop shortcut corresponding to the deleted smart scene exists on a desktop graphical user interface of the device logged onto the user account; and
  deleting the desktop shortcut when the desktop shortcut corresponding to the deleted smart scene exists on the desktop.

11. The device according to claim 10, wherein the processor is further configured to perform:
  when a target smart scene set with the designated smart device is determined to be included among the established smart scenes, determining whether the designated smart device has been utilized to define a triggering condition corresponding to the target triggering condition field of the target smart scene;
  when the designated smart device is determined to have been utilized to define the triggering condition of the target smart scene, prompting whether to change the triggering condition corresponding to the target triggering condition field of the target smart scene; and
  when receiving a change instruction, changing the triggering condition corresponding to the target triggering condition field of the target smart scene as utilizing a new smart device instructed by the change instruction.

12. The device according to claim 9, wherein the processor is further configured to perform:
  receiving an unbundling instruction for releasing a bundling relationship between the designated smart device and the user account; and
  sending to an unbundling server device an unbundling request for releasing the bundling relationship between the designated smart device and the user account, wherein the unbundling request configured to trigger the unbundling server device to delete a bundling relationship corresponding to the designated smart device among the bundling relationships of the user account and feed back the unbundling notification message to the device after the deleting is completed successfully.

13. The device according to claim 12, wherein the processor is further configured to perform:
  when a target smart scene set with the designated smart device is determined to be included among the established smart scenes, determining whether the designated smart device has been utilized to define a triggering condition corresponding to the target triggering condition field of the target smart scene;
  when the designated smart device is determined to have been utilized to define the triggering condition of the target smart scene, prompting whether to change the triggering condition corresponding to the target triggering condition field of the target smart scene; and
  when receiving a change instruction, changing the triggering condition corresponding to the target triggering condition field of the target smart scene as utilizing a new smart device instructed by the change instruction.

14. The device according to claim 9, wherein determining whether the target smart scene set with the designated smart device exists among established smart scenes, comprises:
  searching for a corresponding relationship involving an identification of the designated smart device among corresponding relationships between identifications of smart scenes and identifications of smart devices, wherein a corresponding relationship between an identification of a smart scene and an identification of a smart device comprises a corresponding relationship between the identification of the smart scene and the identification of the smart device involved in the establishment of the smart scene, and wherein the corresponding relationship is stored after the smart scene is established.

15. The device according to claim 14, wherein the processor is further configured to perform:
  when a target smart scene set with the designated smart device is determined to be included among the established smart scenes, determining whether the designated smart device has been utilized to define a triggering condition corresponding to the target triggering condition field of the target smart scene;
  when the designated smart device is determined to have been utilized to define the triggering condition of the target smart scene, prompting whether to change the triggering condition corresponding to the target triggering condition field of the target smart scene; and
  when receiving a change instruction, changing the triggering condition corresponding to the target triggering condition field of the target smart scene as utilizing a new smart device instructed by the change instruction.

16. The device according to claim 9, wherein the processor is further configured to perform:
  when a target smart scene set with the designated smart device is determined to be included among the established smart scenes, determining whether the designated smart device has been utilized to define a triggering condition corresponding to the target triggering condition field of the target smart scene;

when the designated smart device is determined to have been utilized to define the triggering condition of the target smart scene, prompting whether to change the triggering condition corresponding to the target triggering condition field of the target smart scene; and when receiving a change instruction, changing the triggering condition corresponding to the target triggering condition field of the target smart scene as utilizing a new smart device instructed by the change instruction.

17. A non-transitory computer-readable storage medium storing instructions that, when being executed by a processor of a device, cause the device to perform:

receiving an unbundling notification message indicating that a designated smart device has been successfully unbundled from a user account;

determining whether a target smart scene that is set with the designated smart device is included among established smart scenes associated with the user account, wherein the target smart scene is a conditional dataset including a target triggering condition field and a target action field, the target triggering condition field including a value determined by a condition detected by a condition detector device, and the target action field including instructions for controlling the designated smart device based on the value of the target triggering condition field; and when the target smart scene that is set with the designated smart device is determined to be included among the established smart scenes, deleting the target smart scene from association with the user account.

18. The non-transitory computer-readable storage medium according to claim 17, wherein the device is caused to further perform:

detecting whether a desktop shortcut corresponding to the deleted smart scene exists on a desktop graphical user interface of the device logged onto the user account; and when a desktop shortcut corresponding to the deleted smart scene exists on the desktop, deleting the desktop shortcut.

19. The non-transitory computer-readable storage medium according to claim 17, wherein the device is caused to further perform:

receiving an unbundling instruction for releasing a bundling relationship between the designated smart device and the user account; and sending to an unbundling server device an unbundling request for releasing the bundling relationship between the designated smart device and the user account, the unbundling request being for triggering the unbundling server device to delete a bundling relationship corresponding to the designated smart device among the bundling relationships of the user account and feed back the unbundling notification message to the device after the deleting is completed successfully.

20. The non-transitory computer-readable storage medium according to claim 17, wherein determining whether the target smart scene set with the designated smart device exists among established smart scenes, comprises:

searching for a corresponding relationship involving an identification of the designated smart device among corresponding relationships between identifications of smart scenes and identifications of smart devices, wherein a corresponding relationship between an identification of a smart scene and an identification of a smart device comprises a corresponding relationship between the identification of the smart scene and the identification of the smart device involved in the establishment of the smart scene, and wherein the corresponding relationship is stored after the smart scene is established.

* * * * *